United States Patent
Wang

(10) Patent No.: US 10,448,099 B2
(45) Date of Patent: Oct. 15, 2019

(54) APPARATUS AND METHOD FOR PARTICIPATING INTO A TV PROGRAM INTERACTION, METHOD FOR OBTAINING INTERACTION DISTRIBUTION INFORMATION

(71) Applicants: Hisense USA Corporation, Suwanee, GA (US); Hisense International Co., Ltd., Qingdao, Shandong (CN)

(72) Inventor: Gang Wang, Shandong (CN)

(73) Assignees: HISENSE USA CORPORATION, Suwanee, GA (US); HISENSE INTERNATIONAL CO., LTD., Qingdao (CN)

(*) Notice: Subject to any disclaimer, the term of this patent is extended or adjusted under 35 U.S.C. 154(b) by 0 days.

(21) Appl. No.: 15/173,216

(22) Filed: Jun. 3, 2016

(65) Prior Publication Data
US 2017/0111693 A1    Apr. 20, 2017

(30) Foreign Application Priority Data
Oct. 20, 2015  (CN) .......................... 2015 1 0681231

(51) Int. Cl.
*H04N 21/442* (2011.01)
*H04N 21/24* (2011.01)
(Continued)

(52) U.S. Cl.
CPC ... *H04N 21/44222* (2013.01); *H04N 21/2401* (2013.01); *H04N 21/4331* (2013.01); *H04N 21/472* (2013.01); *H04N 21/4788* (2013.01)

(58) Field of Classification Search
CPC .......... H04N 21/44222; H04N 21/472; H04N 21/2401
See application file for complete search history.

(56) References Cited

U.S. PATENT DOCUMENTS

2012/0218471 A1* 8/2012 Gratton ............. H04N 21/2541
348/564
2014/0351860 A1* 11/2014 Chen .................... H04N 21/472
725/51

FOREIGN PATENT DOCUMENTS

| CN | 101267589 | 9/2008 |
| CN | 101867776 | 10/2010 |

(Continued)

OTHER PUBLICATIONS

Office Action from corresponding Chinese Application No. 201510681231.8, dated Sep. 26, 2017 (8 pages).
(Continued)

*Primary Examiner* — Yassin Alata
(74) *Attorney, Agent, or Firm* — Brinks Gilson & Lione

(57) ABSTRACT

The present disclosure discloses an apparatus and method for participating into a TV program interaction, wherein the method includes: generating, by a first terminal, a buffered file in which a correspondence relationship between TV play content, interaction distribution information, and a distribution time of the interaction distribution information is stored; obtaining, by the first terminal, interaction distribution information, in a predetermined interaction period of time from the buffered file; and sending, by the first terminal, the obtained interaction distribution information, to a second terminal so that the second terminal participates into the TV program interaction according to the received interaction distribution information.

12 Claims, 9 Drawing Sheets

(51) Int. Cl.
*H04N 21/472* (2011.01)
*H04N 21/433* (2011.01)
*H04N 21/4788* (2011.01)

(56) References Cited

FOREIGN PATENT DOCUMENTS

| | | |
|---|---|---|
| CN | 101877719 | 11/2010 |
| CN | 102917255 | 2/2013 |
| CN | 103428538 | 12/2013 |
| EP | 1928177 | 2/2010 |

OTHER PUBLICATIONS

Office Action from corresponding Chinese Application No. 201510681231.8, dated Nov. 1, 2017 (9 pages).

\* cited by examiner

APPARATUS AND METHOD FOR PARTICIPATING INTO A TV PROGRAM INTERACTION, METHOD FOR OBTAINING INTERACTION DISTRIBUTION INFORMATION

CROSS-REFERENCE TO RELATED APPLICATION

This application claims the benefit and priority of Chinese Patent Application No. 201510681231.8 filed Oct. 20, 2015. The entire disclosure of the above application is incorporated herein by reference.

FIELD

The present disclosure relates to the field of smart TV sets and particularly to an apparatus and method for participating into a TV program interaction, and a method for obtaining interaction distribution information.

BACKGROUND

This section provides background information related to the present disclosure which is not necessarily prior art.

There has been significantly growing participation on interactive TV program by users along with increasingly diversified TV programs. A large number of existing TV programs typically have interactive programs configured therein to guide the user to participate into interaction, that is, the users can make an information query, a vote, or a comment on the programs, or draw a lottery while the programs are being broadcasted on the air.

SUMMARY

This section provides a general summary of the disclosure, and is not a comprehensive disclosure of its full scope or all of its features.

According to some exemplary embodiments of the disclosure, the disclosure provides a method for participating into a TV program interaction applicable to a first terminal capable of receiving and playing the TV program, the method including:

generating, by a first terminal, a buffered file in which a correspondence relationship between TV play content, interaction distribution information, and a distribution time of the interaction distribution information is stored;

obtaining, by the first terminal, the interaction distribution information, in a predetermined interaction period of time from the buffered file; and sending, by the first terminal, the obtained interaction distribution information, to a second terminal so that the second terminal participates into the TV program interaction according to the received interaction distribution information.

According to some exemplary embodiments of the disclosure, the disclosure provides an apparatus for participating into a TV program interaction, residing in a first terminal, the apparatus including:

a processor; and a memory storing at least one instruction configured, upon being executed by the processor to cause the apparatus:

to generate a buffered file in which a correspondence relationship between TV play content, interaction distribution information, and a distribution time of the interaction distribution information is stored;

to obtain the interaction distribution information, in a predetermined interaction period of time from the buffered file; and to send the obtained interaction distribution information, to a second terminal so that the second terminal participates into the TV program interaction according to the received interaction distribution information.

According to some exemplary embodiments of the disclosure, the disclosure provides a for obtaining interaction distribution information applicable to a first terminal capable of receiving and playing a TV program, the method including:

obtaining, by the first terminal, valid interaction distribution information, wherein the first terminal is capable of receiving and playing the TV program; and the interaction distribution information comprises audio information, text information, image information, and/or video information, and the interaction distribution information is located at any position on a display screen of the first terminal; and sending, by the first terminal, the interaction distribution information, to a second terminal so that the second terminal participates into the TV program interaction according to the received interaction distribution information.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Embodiments of the disclosure can be applicable to two terminals, e.g., a first terminal and a second terminal, both of which are connected over a wired or wireless network, where the first terminal can be any terminal capable of receiving and playing an interactive TV program, and the second terminal can be any terminal capable of accessing the Internet or communicating. For example, the first terminal is a TV set, and the second terminal is a handset; or the first terminal is a PC, and the second terminal is a tablet computer.

Figure 1A:
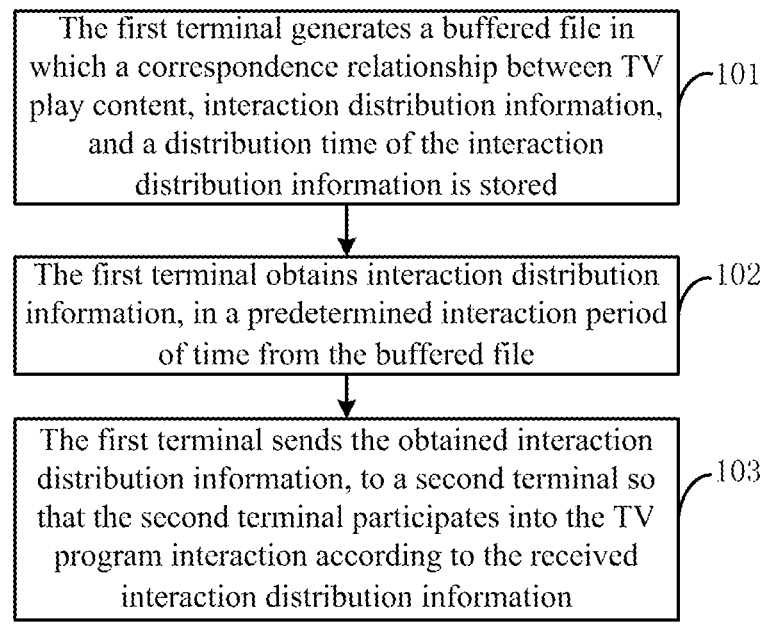
FIG. 1A is a flow chart of a method for participating into a TV program interaction according to some embodiments of the disclosure.

FIG. 1A is a flow chart of a method for participating into a TV program interaction according to some embodiments of the disclosure, applicable to a first terminal, and as illustrated in FIG. 1A, the method includes the following steps:

In the step 101, the first terminal generates a buffered file in which a correspondence relationship between TV play content, interaction distribution information, and a distribution time of the interaction distribution information is stored;

In some embodiments, the TV play content can be any one or combination of a TV channel, a program name, a program play period of time, an advertisement play period of time, and advertisement content; and the interaction distribution information can include audio information, text information, image information and/or video information, for example, the interaction distribution information can be one or combination of a phone number, a postal mailbox, an electronic mailbox, a user identifier of a short message, and a user identifier of instant communication system, a website link, a composed short message text, a composed email text as text information, a bar code, a two-dimensional code, etc., as image information, voice information as audio information, a program trailer as video information, etc.;

In the step 102, the first terminal obtains interaction distribution information in a predetermined interaction period of time from the buffered file;

In some embodiments, the predetermined interaction period of time refers to a preset time duration which is counted backward from the current system time of the first terminal, and the value of the time duration is a preset value, e.g., three hours, three days, or three weeks before the current system time of the first terminal, which can be preset empirically or as required in reality; and In the step 103, the first terminal sends the obtained interaction distribution information, to a second terminal so that the second terminal participates into the TV program interaction according to the received interaction distribution information;

In some embodiments, the second terminal can be a terminal bound in advance with the first terminal, or can be a terminal temporally communicating with the first terminal.

In some embodiments, the method illustrated in FIG. 1A can be performed in the following first or second schemes.

Figure 1B:
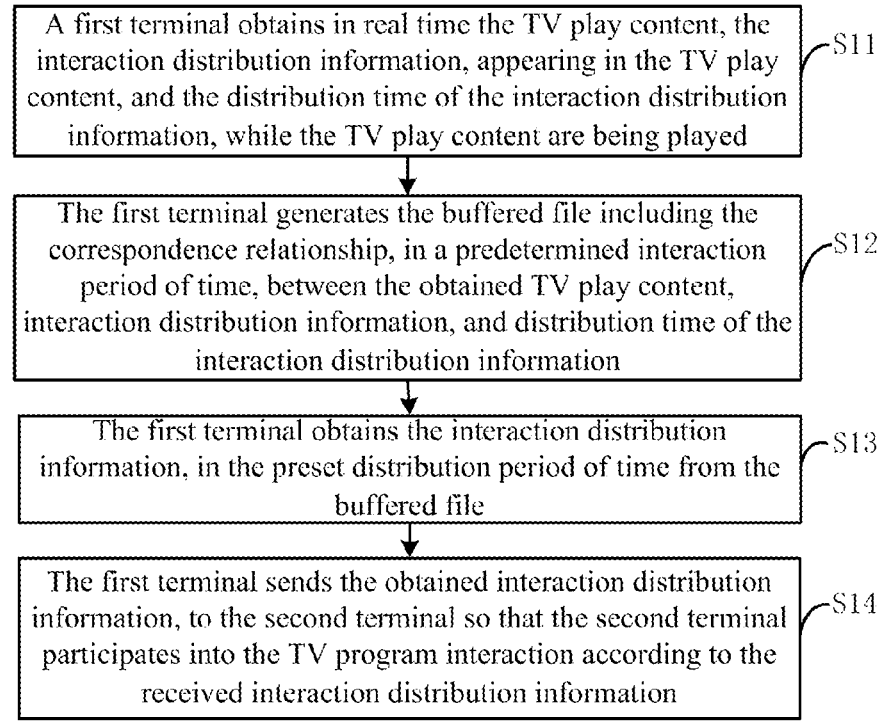
FIG. 1B is another flow chart of a method for participating into a TV program interaction according to some embodiments of the disclosure.

In a first scheme, as illustrated in FIG. 1B, a method for participating into a TV program interaction according to some embodiments of the disclosure includes the following process flow:

In the step S11, a first terminal obtains in real time the TV play content, the interaction distribution information, appearing in the TV play content, and the distribution time of the interaction distribution information, while the TV play content are being played;

Here the TV play content, and the interaction distribution information can be as described above, so a repeated description thereof will be omitted here.

In some embodiments of the disclosure, the first terminal can perform keyword recognition, voice recognition and/or image recognition on the TV play content, while the TV play content are being played, to obtain the interaction distribution information; for example, the first terminal can recognize a keyword in a caption, i.e., information played in a text (a phone number, a postal mailbox, an electronic mailbox, a user identifier of short message, a user identifier of instant communication system, a website link, a composed short message text, a composed email text, etc.), by performing keyword recognition, and can recognize an image and/or a voice in information played in an image, a video, or an audio, by performing image recognition and/or voice recognition;

In the step S12, the first terminal generates the buffered file including the correspondence relationship, in the predetermined interaction period of time, between the obtained TV play content, interaction distribution information, and distribution time of the interaction distribution information;

In some embodiments of the disclosure, the first terminal further maintains the buffered file, when the difference between the distribution time of the interaction distribution information, in the buffered file and the current system time of the first terminal goes beyond the predetermined interaction period of time, then the first terminal deletes the correspondence relationship of the interaction distribution information, so that the buffered file stores the interaction distribution information, in the preset distribution period of time, and the correspondence relationship thereof;

In the step S13, the first terminal obtains the interaction distribution information, in the preset distribution period of time from the buffered file;

Since the buffered file stores the interaction distribution information, in the preset distribution period of time, and the correspondence relationship thereof, all the interaction distribution information, obtained by the first terminal from the buffered file is the interaction distribution information, in the preset distribution period of time;

In the step S14, the first terminal sends the obtained interaction distribution information, to the second terminal so that the second terminal participates into the TV program interaction according to the received interaction distribution information;

In some embodiments of the disclosure, the second terminal can be a terminal bound in advance with the first terminal, or can be a terminal temporally communicating with the first terminal;

In some embodiments of the disclosure, the first terminal can obtain corresponding interaction distribution information, in response to a request from the second terminal, and send the obtained interaction distribution information, to the second terminal, and particularly before the step S13, if the first terminal receives a request message, from the second terminal, including an identifier of TV play content and/or a distribution time of interaction distribution information, then the first terminal determines whether the identifier of TV play content included in the request message can be found in the buffered file, and/or the distribution time included in the request message lies in the predetermined interaction period of time, if so, then obtains from the buffered file the interaction distribution information, in the predetermined interaction period of time, corresponding to the TV play content, to which the identifier of the TV play content, in the request message indicates and/or the interaction distribution information, corresponding to the distribution time of the interaction distribution information, in the request message; and sends the obtained interaction distribution information, to the second terminal.

In some embodiments of the disclosure, the first terminal can alternatively send the buffered file in the predetermined interaction period of time periodically or non-periodically to the second terminal, that is, the first terminal can synchronize or update all or a part of the information in the buffered file into the second terminal.

Figure 1C:
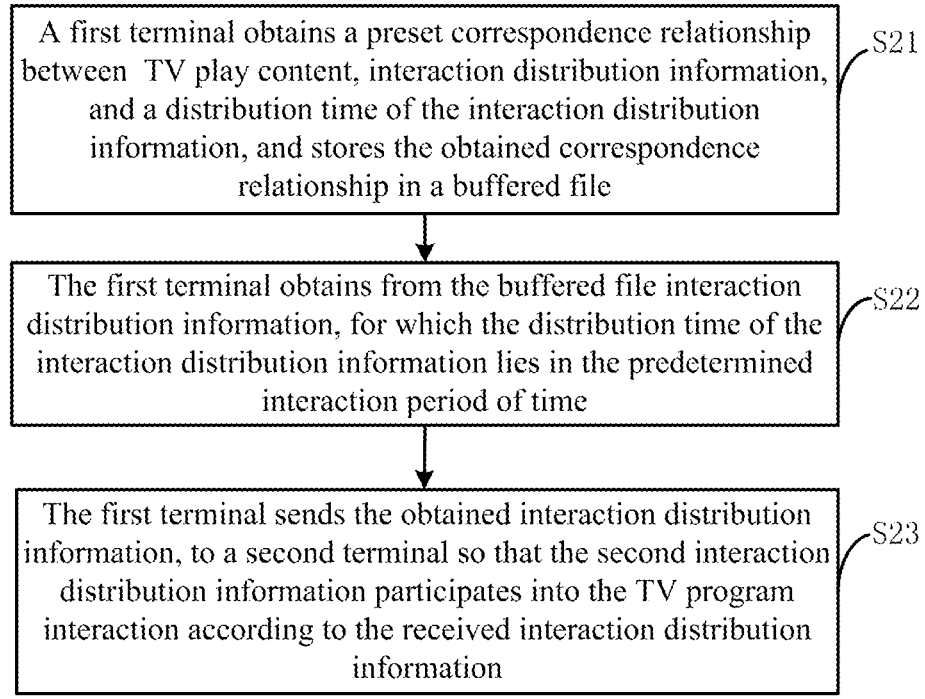
FIG. 1C is another flow chart of a method for participating into a TV program interaction according to some embodiments of the disclosure.

In a second implementation, as illustrated in FIG. 1C, a method for participating into a TV program interaction according to some embodiments of the disclosure includes the following process flow:

In the step S21, a first terminal obtains a preset correspondence relationship between TV play content, interaction distribution information, and a distribution time of the interaction distribution information, and stores the obtained correspondence relationship in the buffered file;

In some embodiments of the disclosure, the TV play content, the interaction distribution information can be as described above, so a repeated description thereof will be omitted here;

In some embodiments of the disclosure, the first terminal further maintains the buffered file, for example, the first terminal can also obtain in real time TV play content, interaction distribution information, appearing in the TV content be played, and a distribution time of the interaction distribution information (simply referred to as information obtained in real time), while the TV play content are being played, and compare the information obtained in real time with the obtained preset correspondence relationship between the TV play content, the interaction distribution information, and the distribution time of the interaction distribution information (simply referred to as a preset correspondence relationship), and if a result of the comparison shows inconsistency, then the first terminal can update the preset correspondence relationship with the information obtained in real time, that is, if any one of the TV play content, the interaction distribution information, and the distribution time of the interaction distribution information, in the preset correspondence relationship obtained by the first terminal is inconsistent with corresponding one of the TV play content, the interaction distribution information, and the distribution time of the interaction distribution information, currently obtained in real time, then the first terminal replaces the preset correspondence relationship with the information obtained in real time;

In the step S22, the first terminal obtains from the buffered file interaction distribution information, for which the distribution time of the interaction distribution information lies in the predetermined interaction period of time;

In some embodiments of the disclosure, the predetermined interaction period of time is as described above, so a repeated description thereof will be omitted here;

Since the buffered file includes interaction distribution information, in various periods of time, the first terminal needs to compare the distribution time of the interaction distribution information with the predetermined interaction period of time to thereby determine the interaction distribution information, in the predetermined interaction period of time; and In the step S23, the first terminal sends the obtained interaction distribution information, to a second terminal so that the second interaction distribution information participates into the TV program interaction according to the received interaction distribution information.

In some embodiments of the disclosure, the first terminal can obtain corresponding interaction distribution information, in response to a request from the second terminal, and send the obtained interaction distribution information, to the second terminal, and particularly before the step S23, if the first terminal receives a request message, from the second terminal, including a identifier of TV play content and/or a distribution time of interaction distribution information, then the first terminal determines whether the identifier of TV play content included in the request message can be found in the buffered file, and/or the distribution time included in the request message lies in the predetermined interaction period of time, if so, then obtains from the buffered file the interaction distribution information, in the predetermined interaction period of time, corresponding to the TV play content, to which the identifier of the TV play content, in the request message indicates and/or the interaction distribution information, corresponding to the distribution time of the interaction distribution information, in the request message; and sends the obtained interaction distribution information, to the second terminal; and In some embodiments of the disclosure, the first terminal can alternatively send the buffered file in the predetermined interaction period of time periodically or non-periodically to the second terminal, that is, the first terminal can synchronize or update all or a part of the information in the buffered file into the second terminal.

Figure 1D:
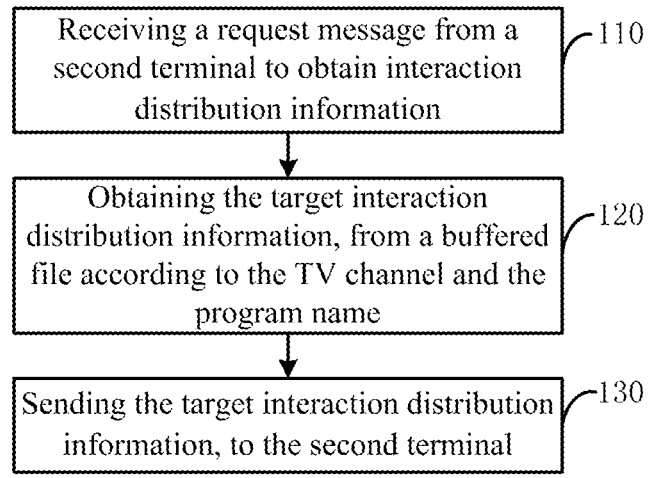
FIG. 1D is another flow chart of a method for participating into a TV program interaction according to some embodiments of the disclosure in a particular application scenario.

FIG. 1D is a process flow chart of a method for participating into a TV program interaction according to some embodiments of the disclosure in a particular application scenario, applicable to a first terminal, and as illustrated in FIG. 1D, the method includes the following process flow:

In the step 110, the first terminal receives a request message from a second terminal to obtain interaction distribution information;

Where the request message includes a TV channel identity and a program name of the interaction distribution information;

In the step 120, the first terminal obtains the target interaction distribution information, from a buffered file according to the TV channel identity and the program name;

Here the buffered file stores interaction distribution information, remaining in a validity period of time (i.e., the predetermined interaction period of time as described above), and TV channels and program names corresponding thereto, i.e., the buffered file created in the step S12 above, and the first terminal can determine in the buffered file the interaction distribution information corresponding to the TV channel identity and the program name in the received request message, i.e., the target interaction distribution information; and In the step 130, the first terminal sends the target interaction distribution information to the second terminal.

The first terminal sends the obtained target interaction distribution information, to the second terminal, where the interaction distribution information includes interaction content and an interaction participation mode, e.g., the name of the interactive program, and a contact.

If the content of the buffered file of the first terminal are as depicted in Table 1, then a list of TV channels and program names received accordingly by the second terminal (i.e., the buffered file synchronized or updated by the first terminal to the second terminal) are as depicted in Table 2, where the second terminal needs to obtain the target interaction distribution information, as comments fed back by audiences about the program entitled "Focus on Agriculture, Rural areas and Farmers", and the first terminal receives a request sent by the second terminal to obtain an interaction participation mode of "Focus on Agriculture, Rural areas and Farmers", extracts the program channel "CCTV7" and the program name "Focus on Agriculture, Rural areas and Farmers" from the request, determines in Table 1 of the buffered file interaction distribution information corresponding to "Focus on Agriculture, Rural areas and Farmers", and sends the corresponding interaction participation mode "PHONE value=010-82101628" "EMAIL value=jujiaosannong@cntv.cn" to the second terminal.

TABLE 1

| Channel | Program | Interaction information |
|---|---|---|
| Jiangsu TV | No bothering without sincerity | NAME value="李 沛 烈", EMAIL value=fcwrlipl413@jstv.cn; NAME value="陈 三", EMAIL value=fcwrcs413@jstv.cn; NAME value="李 辰", EMAIL value=fcwrlic413@jstv.cn; |
| CCTV7 | Focus on Agriculture, Rural areas and Farmers | PHONEvalue=010-82101628,EMAIL value=jujiaosannong@cntv.cn |
| CCTV7 | Travel to Beautiful Country In China | PHONEvalue="010-82101758",EMAIL value=cctv7life567@126.com |

TABLE 2

| Channel | Program |
|---|---|
| Jiangsu TV | No bothering without sincerity |
| CCTV7 | Focus on Agriculture, Rural areas and Farmers |
| CCTV7 | Travel to Beautiful Country In China |

Figure 2:
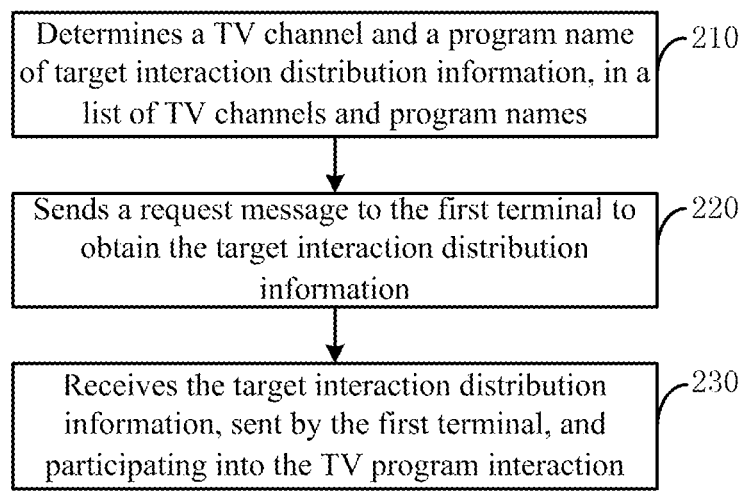
FIG. 2 is another flow chart of a method for participating into a TV program interaction according to some embodiments of the disclosure in a particular application scenario.

FIG. 2 is another flow chart of a method for participating into a TV program interaction according to some embodiments of the disclosure in a particular application scenario, applicable to a second terminal, and as illustrated in FIG. 2, the method includes the following steps:

In the step 210, the second terminal determines a TV channel and a program name of target interaction distribution information, in a list of TV channels and program names (i.e., a received buffered file);

A first terminal can send the buffered file in a predetermined interaction period of time, periodically or non-periodically to the second terminal, that is, the first terminal synchronizes or updates all or a part of the information in the buffered file into the second file; or the first terminal can synchronize automatically a list of TV program channels and names in the buffered file to the second terminal when the content of the buffered file are changed, and the second terminal can determine the TV channel and the program name of the target interaction distribution information, in the received list of TV program channels and names;

In the step 220, the second terminal sends a request message to the first terminal to obtain the target interaction distribution information;

A user of the second terminal sends the request message to the first terminal to obtain the interaction distribution information, by clicking on the name of a TV program corresponding to the interaction distribution information, in the list, where the request message includes the TV channel and the program name corresponding to the target interaction distribution information to be obtained by the second terminal; and In the step 230, the second terminal receives the target interaction distribution information, sent by the first terminal, and participates into the TV program interaction.

The second terminal receives the target interaction distribution information, returned by the first terminal, and participates into the TV program interaction, where the interaction distribution information includes an interaction participation mode and interaction content.

In some embodiments, upon reception of the target interaction distribution information, returned by the first terminal, the second terminal extracts the interaction participation mode and the interaction content, and generates and displays an interaction participation window on a display screen of the second terminal to ask the user to participation into interaction, where the content of the interaction participation window are consistent with the target interaction distribution information, sent by the first terminal. Here the interaction participation mode can include participation via a short message, participation via voice, participation via a web page, etc.

Here the different interaction participation mode corresponds to a different interaction participation window, and for example, if the interaction participation mode is participation via a short message, then the interaction content will be "Compose a short message of 100+ the serial number of the candidate and send the short message to 10011", a short composer of the second terminal generates automatically from the interaction content a short message including a short message text "100+" and a receive number "10011", and the user supplements the text of the short message with the serial number of the candidate, e.g., 01, and presses down the "Confirm" button to thereby send the short message "100+01" to 10011.

In some embodiments, if the interaction participation mode is participation via voice, for example, the interaction participation mode is to dial the number 666666 for a voice session, then the second terminal will generate automatically a session interface for the called number 666666, and the user can press down the "Dial" button to thereby participate into interaction.

In some embodiments, if the interaction participation mode is participation via a web page, then the second terminal will launch automatically a browser, enter an interaction web address into an address bar, and open the corresponding web page, so that the user can enter the content required for interaction, into the web page, and then submit it to thereby participate into interaction.

In correspondence to the embodiment of the first terminal, the user of the second terminal determines in Table 2 that the target interaction distribution information corresponds to the program channel "CCTV7", and the program name "Focus on Agriculture, Rural areas and Farmers", so the user clicks on "Focus on Agriculture, Rural areas and Farmers" to trigger a request to be sent to the first terminal to obtain an interaction participation mode of "Focus on Agriculture, Rural areas and Farmers", and interacts with the program upon reception of the interaction participation mode sent by the first terminal.

In some embodiments above, the second terminal determines in the received list of TV channels and TV information the TV channel and the program information corresponding to the target interaction distribution information, and the second terminal sends the request message to the first terminal to obtain the interaction distribution information; upon reception of the request message, the first terminal determines the interaction distribution information corresponding to the TV channel and the program information, and sends the target interaction distribution information, to the second terminal; and the second terminal receives the target interaction distribution information, and participates into the interactive TV program. In the embodiments above, the user can obtain the interaction distribution information, for which the play occasion has been missed.

Figure 3:
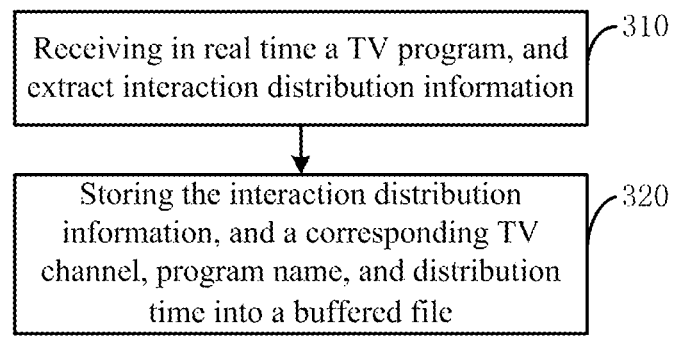
FIG. 3 is a flow chart of a method for generating a buffered file according to some embodiments of the disclosure.

FIG. 3 is a flow chart of a method for generating a buffered file according to some embodiments of the disclosure, where the method includes the followings steps:

In the step 310, a first terminal receives in real time a TV program, corresponding to step S11 above, and extracts interaction distribution information.

The first terminal receives in real time the TV program sent by a TV program sending system, e.g., a TV program network server, etc., and extracts the interaction distribution information including interaction content and an interaction participation mode. The interaction distribution information is extracted by recognizing a keyword, voice, and an image, where keyword recognition relates to a caption interaction mode in which a keyword, e.g., a phone number, a short message, an e-mailbox, a user identifier of instant communication, etc., appears in a TV program, voice recognition relates to a mode in which a host of the TV program speaks interaction information, and image recognition relates to an interaction participation mode in which a two-dimensional code is scanned; and In the step 320, the first terminal stores the interaction distribution information, and a corresponding TV channel, program name, and distribution time into a buffered file.

After the first terminal extracts the interaction distribution information, the first terminal obtains the channel, the program name, and the distribution time of the TV program corresponding to the interaction distribution information from a display memory, and stores the interaction distribution information, and the TV channel, the program name, and the distribution time corresponding to the interaction distribution information, into the buffered file as an entry.

Entries stored in the buffered file are deleted at specified instances of time. It is determined whether the difference between the distribution time of any one of the interaction distribution information, in the buffered file, and the current system time is above a preset value (that is, whether the interaction distribution information goes beyond a predetermined interaction period of time), and if so, then the entry including the any one interaction distribution information will be deleted. The preset value can be preset as a function of the real-time characteristic of interaction.

Historical interaction distribution information, in a validity period of time, distributed by the first terminal is stored in the buffered file for transmission, synchronization or update to the second terminal so that the second terminal can obtain the historical interaction information to thereby improve the experience of a user.

Figure 4:
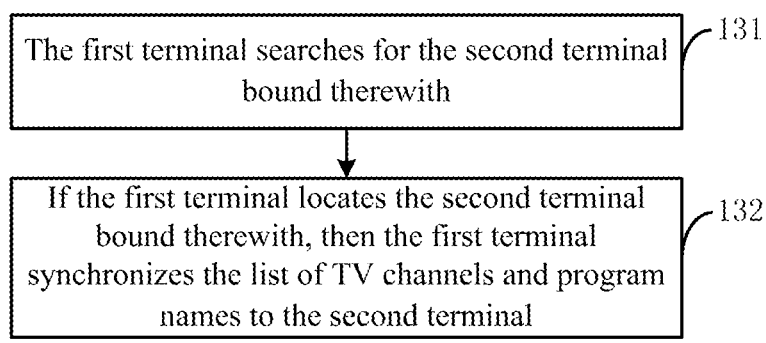
FIG. 4 is a process flow chart of searching for a second terminal in the method for participating into a TV program interaction according to some embodiments of the disclosure.

FIG. 4 is a process flow chart of searching for a second terminal in a method for participating into a TV program interaction according to some embodiments of the disclosure, and further to the embodiment illustrated in FIG. 1D, before the target interaction distribution information is sent, the following steps of searching for the second terminal are further included:

In the step 131, the first terminal searches for the second terminal bound therewith;

By way of an example, a device identification number capable of identifying uniquely the second terminal is stored in the first terminal, e.g., a device number, an International Mobile Equipment Identity (IMEI), an International Mobile Subscriber identification Number (IMSI), a phone number, etc., of the second terminal, and the first terminal firstly obtains device identifiers of terminal devices nearby, and determines whether any one of the device identifiers consistent with the stored device identifier of the terminal bound therewith, and if so, then the first terminal determines that the terminal is the second terminal bound therewith; and In the step 132, if the first terminal locates the second terminal bound therewith, then the first terminal synchronizes the list of TV channels and program names to the second terminal.

In order to avoid the first terminal from sending the TV program channels and program names to all the terminal devices in the same wired or wireless network, the first terminal can be bound with the second terminal, and the first terminal will firstly identify the second terminal bound therewith, and then send the list of TV program channels and program names thereto.

Figure 5:
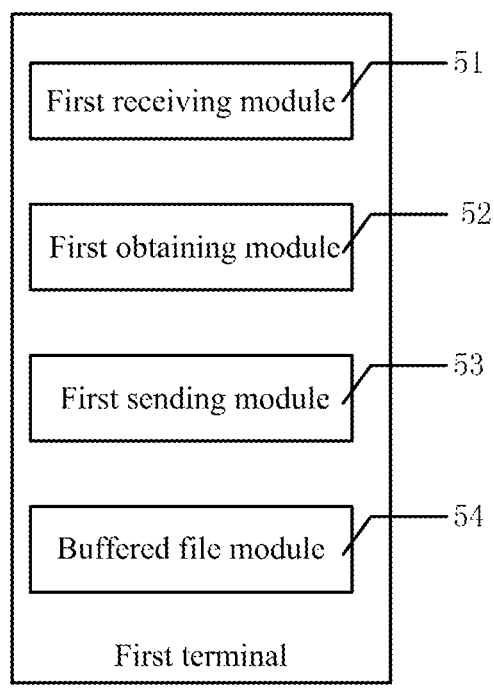
FIG. 5 is a structural block diagram of an apparatus for participating into a TV program interaction according to some embodiments of the disclosure.
Figure 6:
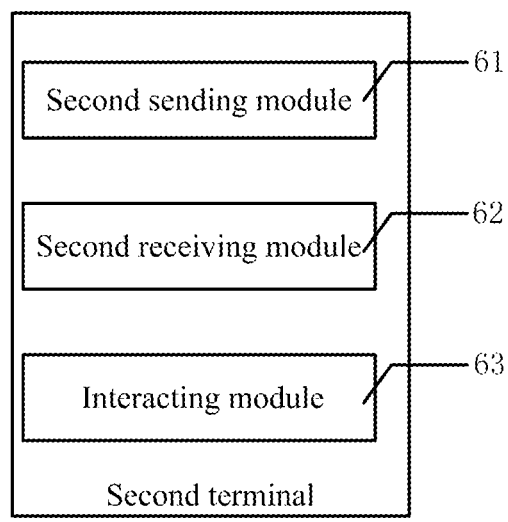
FIG. 6 is a structural block diagram of a participation apparatus for participating into a TV program interaction according to some embodiments of the disclosure.

FIG. 5 is a schematic structural diagram of an apparatus for participating into a TV program interaction according to some embodiments of the disclosure, corresponding to FIG. 1D, which includes a first receiving module 51, a first obtaining module 52, a first sending module 53, and a buffered file module 54, all of which are arranged in a first terminal; and FIG. 6 is a schematic structural diagram of an apparatus for participating into a TV program interaction according to some embodiments of the disclosure, corresponding to FIG. 2, which includes a second sending module 61, a second receiving module 62, and an interacting module 63, all of which are arranged in a second terminal. The structures in FIG. 5 and FIG. 6 will be described below.

The first receiving module 51 communicating with the second sending module 61 is configured to receive a request message sent by the second terminal to obtain interaction distribution information, where the request message includes a TV channel identity and a program name of the interaction distribution information; the first obtaining module 52 connected with the first receiving module 51 is configured to obtain the target interaction distribution information, from a buffered file according to the TV channel identity and the program name, upon reception of the request sent by the second terminal to obtain the interaction distribution information; and the first sending module 53 connected with the first obtaining module 52 is configured to send the obtained interaction distribution information, to the second terminal; and The second sending module 61 is configured to send the request message to the first terminal to obtain the interaction distribution information, after determining a TV channel and program information of the interaction distribution information; the second receiving module 62 communicating with the first sending module 53 is configured to receive the target interaction distribution information, sent by the first terminal; and the interacting module 63 connected with the second receiving module 62 is configured to participate into the TV program interaction upon reception of the target interaction distribution information.

Figure 7:
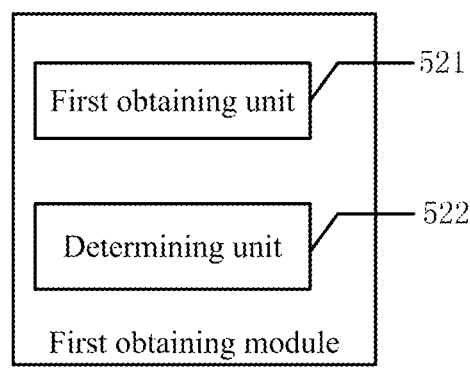
FIG. 7 is a structural block diagram of a first obtaining module in the apparatus for participating into a TV program interaction according to some embodiments of the disclosure.

FIG. 7 is a structural block diagram of the first obtaining module in the apparatus for participating into a TV program interaction according to some embodiments of the disclosure, and as illustrated in FIG. 7, the first obtaining module 52 includes a first obtaining unit 521 configured to obtain the TV channel and the program name corresponding to the interaction distribution information, from the request message sent by the second terminal to obtain the interaction distribution information; and a determining unit 522 is configured to determine in the buffered file the target interaction distribution information, to be sent by the first terminal to the second terminal, according to the TV channel and the program name of the interaction distribution information.

Figure 8:
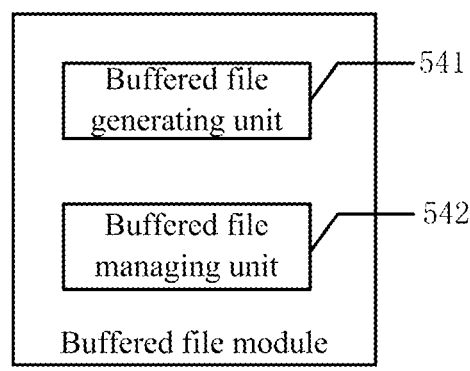
FIG. 8 is a structural block diagram of a buffered file module in apparatus for participating into a TV program interaction according to some embodiments of the disclosure.

FIG. 8 is a structural diagram of the buffered file module in the apparatus for participating into a TV program interaction according to some embodiments of the disclosure, and as illustrated in FIG. 8, the buffered file module 54 includes a buffered file generating unit 541 configured to obtain in real time interaction distribution information, of TV programs, and related parameters thereof, and to generate the buffered file; and a buffered file managing unit 542 is configured to delete any one of the interaction distribution information, and the related parameters corresponding thereto if the difference between a distribution time of the any one interaction distribution information, and the current system time is above a preset value.

It shall be noted that the apparatuses for participating into a TV program interaction according to the embodiments above have been described as the respective functional modules into which the apparatuses are divided into, merely by way of an example, but the functions above can be allocated to and performed by different functional modules as required in a real application.

Figure 9:
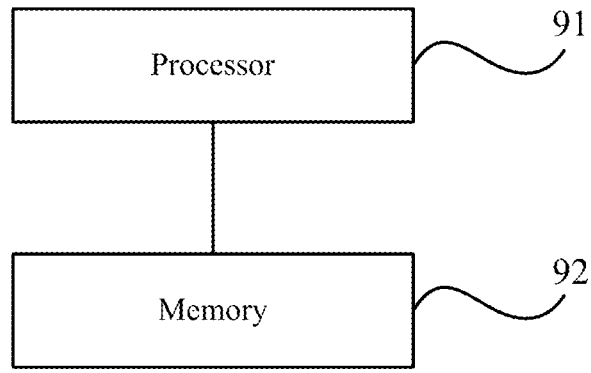
FIG. 9 is another structural block diagram of an apparatus for participating into a TV program interaction according to some embodiments of the disclosure.

Some embodiments of the disclosure further provide an apparatus for participating into a TV program interaction residing in the first terminal 900, and as illustrated in FIG. 9, the apparatus includes a processor 91, and a memory 92 storing at least one instruction, where in correspondence to the process flow illustrated in FIG. 1A, the at least one instruction is configured, upon being executed by the processor 91:

To generate a buffered file in which a correspondence relationship between TV play content, interaction distribution information, and a distribution time of the interaction distribution information is stored;

To obtain the interaction distribution information, in a predetermined interaction period of time from the buffered file; and To send the obtained interaction distribution information, to a second terminal so that the second terminal participates into the TV program interaction according to the received interaction distribution information.

In some embodiments of the disclosure, the at least one instruction configured, upon being executed by the processor 91, to generate the buffered file is configured to obtain in real time the TV play content, the interaction distribution information, appearing in the TV play content, and the distribution time of the interaction distribution information, while the TV play content are being played; to generate the buffered file including a correspondence relationship between the obtained TV play content, interaction distribution information, and distribution time of the interaction distribution information, in the predetermined interaction period of time. Particularly the at least one instruction configured, upon being executed by the processor to obtain in real time the interaction distribution information is configured to perform keyword recognition, voice recognition and/or image recognition on the TV play content, while the TV play content are being played, to obtain the interaction distribution information. Furthermore the at least one instruction is further configured, upon being executed by the processor 91, to determine whether the difference between the distribution time of the interaction distribution information, in the buffered file, and the current system time of the first terminal goes beyond the predetermined interaction period of time, and if so, then to delete the correspondence relationship of the interaction distribution information.

In some embodiments of the disclosure, the at least one instruction is configured, upon being executed by the processor 91, to generate the buffered file is configured to obtain a preset correspondence relationship between the TV play content, the interaction distribution information, and the distribution time of the interaction distribution information, and to store the obtained correspondence relationship in the buffered file. The at least one instruction is configured, upon being executed by the processor 91, to obtain the interaction distribution information, in the predetermined interaction period of time from the buffered file is configured to obtain from the buffered file the interaction distribution information, for which the distribution time lies in a predetermined interaction period of time.

In some embodiments of the disclosure, the at least one instruction is further configured, upon being executed by the processor 91, to receive a request message, from the second terminal, including an identifier of TV play content and/or a distribution time of interaction distribution information, and then the at least one instruction configured, upon being executed by the processor 91, to obtain the interaction distribution information, in the predetermined interaction period of time from the buffered file is configured to obtain from the buffered file the interaction distribution information, in the predetermined interaction period of time, corresponding to the TV play content, to which the identifier of the TV play content, in the request message indicates and/or the interaction distribution information, corresponding to the distribution time of the interaction distribution information, in the request message.

Figure 10:
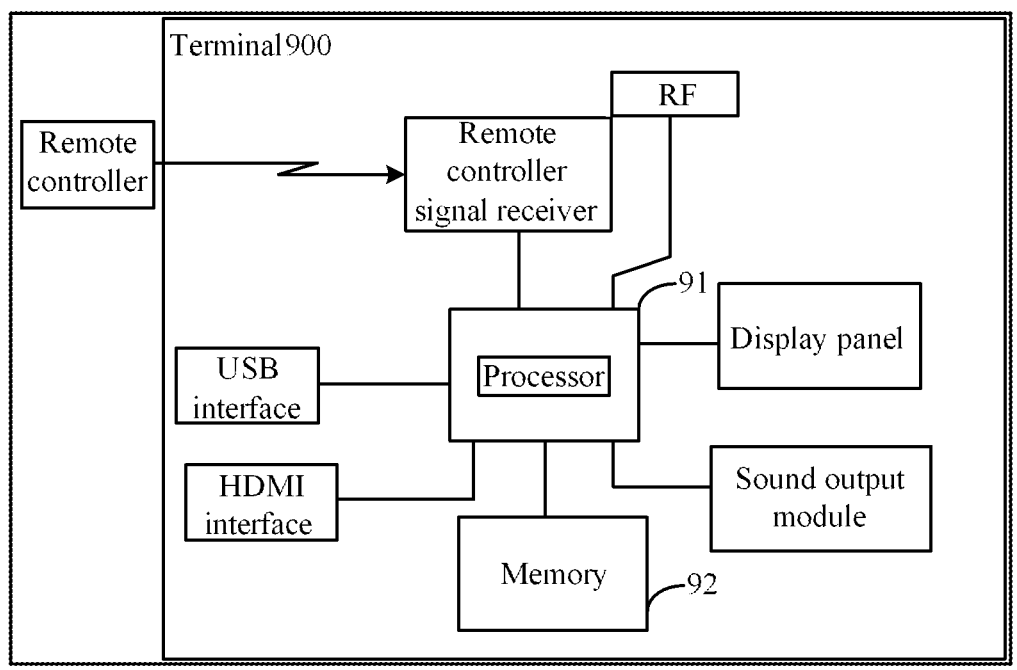
FIG. 10 is another structural block diagram of a participating apparatus for participating into a TV program interaction according to some embodiments of the disclosure.

As illustrated in FIG. 10, the first terminal 900 can include a memory, an input unit, an output unit, one or more processors, and other components. Those skilled in the art can appreciate that the terminal will not be limited to the structure of the terminal illustrated in FIG. 10, but can include more or less components than those as illustrated or some of the components can be combined or different components can be arranged, where:

The memory can be configured to store software programs and modules, and the processor can be configured to run the software programs and modules stored in the memory to thereby perform various function applications and data processing. The memory can include a high-speed random access memory and can further include a nonvolatile memory, e.g., at least one magnetic disk memory device, a flash memory device or another volatile solid memory device. Moreover the memory can further include a memory controller configured to provide an access of the processor and the input unit to the memory.

The processor is a control center of the terminal 900, has the respective components of the entire terminal connected by various interfaces and lines, and runs or executes the software programs and/or the modules stored in the memory and invokes the data stored in the memory to perform the various functions of the terminal 900 and process the data to thereby manage and control the terminal as a whole. Optionally the processor can include one or more processing cores; and preferably the processor can be integrated with an application processor and a modem processor, where the application processor generally handles the operating system, the user interfaces, the applications, etc., and the modem processor generally handles wireless communication. As can be appreciated, the modem processor may not be integrated into the processor.

The terminal 900 can include a TV and radio receiver, a High-Definition Multimedia (HDMI) interface, a USB interface, an audio and video input interface, and other input units, and the input units can further include a remote control receiver to receive a signal sent by a remote controller. Moreover the input units can further include a touch sensitive surface and other input devices, where the touch sensitive surface can be embodied in various types of resistive, capacitive, infrared, surface sound wave and other types, and the other input device can include but will not be limited to one or more of a physical keyboard, functional keys (e.g., a power-on or-off press key, etc.), a track ball, a mouse, a joystick, etc.

The output unit is configured to output an audio signal, a video signal, an alert signal, a vibration signal, etc. The output unit can include a display panel, a sound output module, etc. The display panel can be configured to display information input by a user or information provided to the user and various graphic user interfaces of the terminal 900, where these graphic user interfaces can be composed of graphics, texts, icons, videos and any combination thereof. For example, the display panel can be embodied as a Liquid Crystal Display (LCD), an Organic Light-Emitting Diode (OLED), a flexible display, a 3D display, a CRT, a plasmas display panel, etc.

The terminal 900 can further include at least one sensor (not illustrated), e.g., an optical sensor, a motion sensor and other sensors. Particularly the optical sensor can include an ambient optical sensor and a proximity sensor, where the ambient optical sensor can adjust the brightness of the display panel according to the luminosity of ambient light rays, and the proximity sensor can power off the display panel and/or a backlight when the terminal 900 moves to some position. The terminal 900 can be further configured with a gyroscope, a barometer, a hygrometer, a thermometer, an infrared sensor and other sensors.

The terminal 900 can further include an audio circuit (not illustrated), and a speaker and a transducer can provide an audio interface between the user and the terminal 900. The audio circuit can convert received audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor for processing and then transmitted to another terminal, for example, or the audio data is output to the memory or further processing. The audio circuit may further include an earphone jack for communication between a peripheral earphone and the terminal 900.

Moreover the terminal 900 can further include a Radio Frequency (RF) circuit. The RF circuit can be configured to receive and transmit a signal. Typically the RF circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the terminal 900 can further include a web cam, a Bluetooth module, etc.

Moreover the terminal 900 further includes a Wireless Fidelity (WiFi) module (not illustrated). The WiFi is a technology of short-range wireless transmission, and the terminal 900 can assist the user in transmitting and receiving an email, browsing a web page, accessing streaming media, etc., and also provide the user with a wireless broadband access to the Internet, through the WiFi module. However it can be appreciated that the WiFi module may not necessarily be included in the terminal 900 but can be omitted as required without departing from the scope of the spirit of this disclosure.

Figure 11:
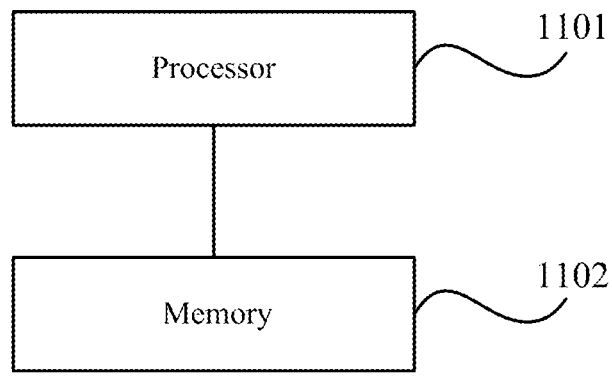
FIG. 11 is a structural block diagram of a first terminal according to some embodiments of the disclosure.

Some embodiments of the disclosure further provide a TV program interaction participating apparatus residing in the second terminal 1000, and as illustrated in FIG. 11, the apparatus includes:

A processor 1101; and

A memory 1102 storing at least one instruction configured, upon being executed by the processor 101:

To determine a TV channel and program name of target interaction distribution information, in a list of TV channels and program names;

To send a request message to a first terminal to obtain the target interaction distribution information, where the request message includes the TV channel and the program name corresponding to the target interaction distribution information; and To receive the target interaction distribution information, and to participate into the TV program interaction.

In some embodiments of the disclosure, the at least one instruction is configured, upon being executed by the processor 1101, to receive the TV channel and the program name, sent by the first terminal, corresponding to the interaction distribution information, before determining the TV channel and the program name of the target interaction distribution information.

In some embodiments of the disclosure, the at least one instruction configured, upon being executed by the processor 1101, to receive the target interaction distribution information, and to participate into the TV program interaction is configured to receive the target interaction distribution information sent by the first terminal, to extract an interaction participation mode and interaction content, and to generate and display a participation window on a display screen of the second terminal.

Figure 12:
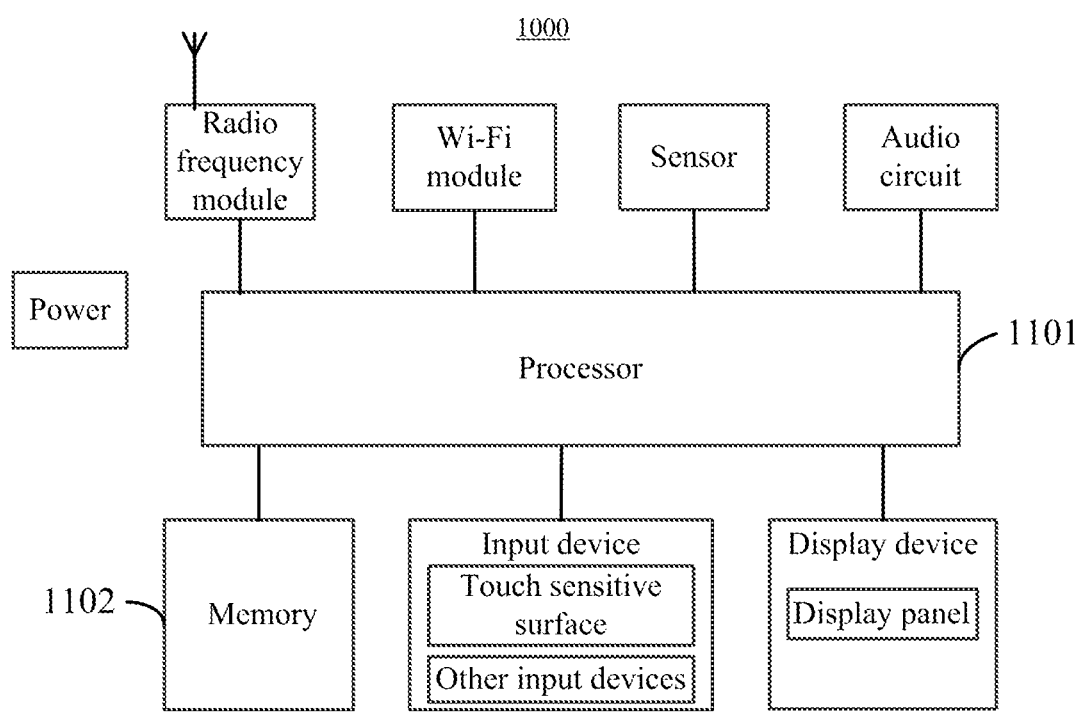
FIG. 12 is a structural block diagram of a second terminal according to some embodiments of the disclosure.

As illustrated in FIG. 12, the terminal 1000 can be any smart terminal or handheld device (e.g., a handset, a tablet PC, a PDA, etc.) which can include a processor including one or more processing cores, an input device, a display component, a sensor, an audio circuit, a Wi-Fi module, a power source, and other components. Those skilled in the art can appreciate that the structure of the terminal 1000 in this embodiment will not be intended to be limiting but can include more or fewer components or have some of the components combined or different components arranged, where:

The radio frequency circuit can be configured to receive and transmit a signal in the course of receiving and transmitting information or in communication, particularly by transferring downlink information of a base station to the one or more processors for processing upon reception of the downlink information; and also transmitting uplink data to the base station. Typically the radio frequency circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the radio frequency circuit can further communicate with a network and another device through wireless communication. The wireless communication can comply with any of communication standards or protocols including but not limited to the GSM (Global System of Mobile communication), the GPRS (General Packet Radio Service), the CDMA (Code Division Multiple Access), the WCDMA (Wideband Code Division Multiple Access), the LTE (Long Term Evolution), an e-mail, the SMS (Short Messaging Service), etc.

The memory can be configured to store software programs and modules, and the processor is configured to run the software programs and modules stored in the memory to thereby perform various function applications and data processing. The memory can generally include a program storage area and a data storage area, where an operating system, applications required for at least one function (e.g., an audio playing function, an image playing function, etc.), etc., can be stored in the program storage area; and data created for use of the terminal 1000 (e.g., audio data, an address book etc.), etc., can be stored in the data storage area. Moreover the memory can include a high-speed random access memory and can further include a nonvolatile memory, e.g., at least one magnetic-disk memory device, a flash memory device or another volatile solid memory device. Correspondingly the memory can further include a memory controller configured to provide an access of the processor and the input device to the memory.

The input device can be configured to receive input digital or character information and to generate a keyboard, mouse, joystick, optical or track ball signal input related to user setting and function control. Particularly the input device can include a touch sensitive surface and another input device. The touch sensitive surface, also referred to as a touch display screen or a touch control pad, can be configured to collect a touch operation by a user thereon or in proximity thereto (e.g., an operation by the user on or in proximity to the touch sensitive surface using his or her finger, a stylus or any other appropriate object or attachment) and to drive a corresponding connected device by preset program. Optionally the touch sensitive surface can include two components which are a touch detection device and a touch controller, where the touch detection device detects the position of touching by the user and detects a signal as a result of the touch operation and transfers the signal to the touch controller; and the touch controller receives the touch signal from the touch detection device and converts it into coordinates of a touch point and further transfers them to the processor and can receive and execute a command sent by the processor. Moreover the touch sensitive surface can be embodied in various types of resistive, capacitive, infrared, surface sound wave and other types. The input device can further include another input device in addition to the touch sensitive surface. Particularly the other input device can include but will not be limited to one or more of a physical keyboard, functional keys (e.g., volume control press keys, a power-on or-off press key, etc.), a track ball, a mouse, a joystick, etc.

The display device can be configured to display information input by the user or information provided to the user and various graphic user interfaces of the terminal 1000, where these graphic user interfaces can be composed of graphics, texts, icons, videos and any combination thereof. The display device can include a display panel which can be optionally configured in the form of a Liquid Crystal Display (LCD), an Organic Light-Emitting Diode (OLED) display, etc. Furthermore the touch sensitive surface can overlie the display panel, and the touch sensitive surface, upon detection of the touch operation thereon or in proximity thereto, transfers it to the processor to determine the type of the touch event, and thereafter the processor provides a corresponding visual output on the display panel according to the type of the touch event. Although the touch sensitive surface and the display device are embodied in this embodiment as two separate components to perform the input and output functions, the touch sensitive surface and the display device can be integrated to perform the input and output functions in some embodiments.

The terminal 1000 can further include at least one sensor, e.g., an optical sensor, a motion sensor and other sensors. Particularly the optical sensor can include an ambient optical sensor and a proximity sensor, where the ambient optical sensor can adjust the brightness of the display panel according to the luminosity of ambient light rays, and the proximity sensor can power off the display panel and/or a backlight when the terminal 1000 moves in proximity to an ear. A gravity acceleration sensor which is a motion sensor can detect the magnitudes of accelerations in respective directions (typically three axes) and can detect the magnitude and the direction of gravity when the sensor is stationary and can be configured to perform applications of identifying the posture of a handset (e.g., switching between landscape and portrait modes, relevant games, calibration of the posture of a magnetometer, etc.), a relevant function of identifying vibration (e.g., a pedometer, a knock, etc.), etc.; and the terminal 1000 can be further configured with a gyroscope, a barometer, a hygrometer, a thermometer, an infrared sensor and other sensors, and a repeated description of these components will be omitted here.

The audio circuit, a speaker and a transducer can provide an audio interface between the user and the terminal 1000. The audio circuit can convert received audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor for processing and then transmitted to another apparatus through the radio frequency circuit, for example, or the audio data is output to the memory for further processing. The audio circuit may further include an earphone jack for communication between a peripheral earphone and the terminal 1000.

The Wi-Fi falls into the category of short-range wireless transmission technologies, and the terminal 1000 can assist the user in receiving and transmitting an e-mail, browsing a webpage, accessing streaming media, etc., through the Wi-Fi module by which the user is provided with a wireless access to the broadband Internet. Although the Wi-Fi module is illustrated in this embodiment, it can be appreciated that it may not be necessarily required for the terminal 1000 but can be omitted as desired without departing from the scope of the disclosure.

The processor is a control component of the terminal 1000, has the respective components connected by various interfaces and lines, and runs or executes the software programs and/or modules stored in the memory and invokes the data stored in the memory to perform the various functions of the terminal 1000 and process the data to thereby manage and control the handset as a whole. Optionally the processor can include one or more processing cores; and preferably the processor can be integrated with an application processor and a modem processor, where the application processor generally handles the operating system, the user interfaces, the applications, etc., and the modem processor generally handles wireless communication. As can be appreciated, the modem processor above may not be integrated into the processor.

The terminal 1000 further includes a power source (e.g., a battery) powering the respective components, and preferably the power source can be logically connected with the processor through a power management system to thereby perform charging and discharging management, power consumption management, etc., through the power management system. The power source can further include one or more DC or AC power sources, recharging systems, power source failure detection circuits, power source transformers or inverters, power source status indicators and any other components.

Although not illustrated, the terminal 100 can further include a camera, a Bluetooth module, etc., but a repeated description thereof will be omitted here. Particularly in this embodiment, the display device of the terminal 100 is a touch screen display, and the terminal 100 further includes a memory, and one or more programs stored in the memory and configured to be executed by one or more processors.

Figure 13:
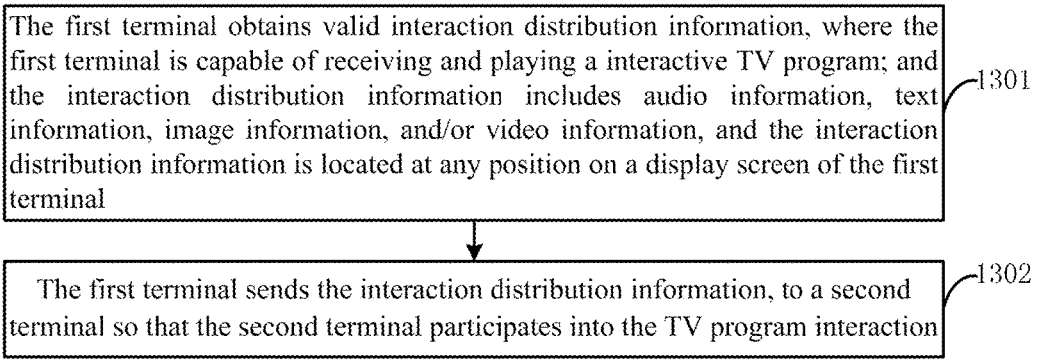
FIG. 13 is another flow chart of a method for obtaining interaction distribution information according to some embodiments of the disclosure.

FIG. 13 is another flow chart of a method for participating into a TV program interaction according to some embodiments of the disclosure, applicable to a first terminal, and as illustrated in FIG. 13, the method further includes the following steps:

In the step 1301, the first terminal obtains valid interaction distribution information, where the first terminal is capable of receiving and playing an interactive TV program; and the interaction distribution information includes audio information, text information, image information, and/or video information, and the interaction distribution information is located at any position on a display screen of the first terminal;

Here the valid interaction distribution information refers to interaction distribution information, for which the difference between distribution time of the interaction distribution information, and the current system time is not above a preset value; and In the step 1302, the first terminal sends the interaction distribution information, to a second terminal so that the second terminal participates into the TV program interaction.

Before the first terminal sends the interaction distribution information, to the second terminal, the method further includes:

The first terminal generates a buffered file according to the interaction distribution information, and stores the buffered file into a buffer, where the buffered file includes information corresponding to the interaction distribution information, and TV play content, corresponding to the interaction distribution information, and the TV play content include at least one of TV channels, program names, advertisement play period of time, and program play period of time.

Figure 14:
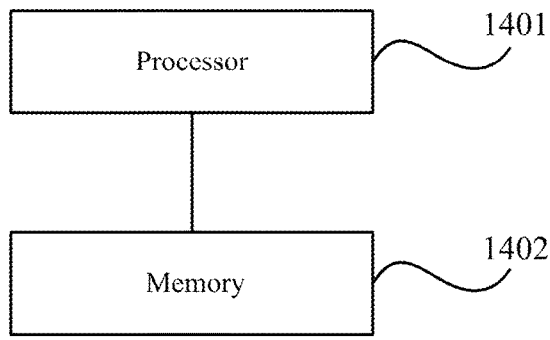
FIG. 14 is another structural block diagram of an apparatus for obtaining interaction distribution information according to some embodiments of the disclosure.

Some embodiments of the disclosure further provide an apparatus for participating into a TV program interaction residing in the first terminal, the first terminal is capable of receiving and playing a TV program; and as illustrated in FIG. 14, the apparatus includes a processor 1401, and a memory 1402 storing at least one instruction, where in correspondence to the process flow illustrated in FIG. 13, the at least one instruction is configured, upon being executed by the processor 1401:

To obtain valid interaction distribution information, where the interaction distribution information includes audio information, text information, image information, and/or video information, and the interaction distribution information is located at any position on a display screen of the first terminal; and To send the interaction distribution information, to a second terminal so that the second terminal participates into the TV program interaction.

The at least one instruction is further configured, upon being executed by the processor 1401, to generate a buffered file according to the interaction distribution information, and to store the buffered file into a buffer, where the buffered file includes information corresponding to the interaction distribution information, and TV play content, corresponding to the interaction distribution information, and the TV play content include at least one of TV channels, program names, advertisement play period of time, and program play period of time.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A first terminal capable of receiving and playing an interactive TV program and for prompting a second terminal to participate into a TV program interaction, the first terminal comprising:
    a transmitter;
    a display screen;
    a processor; and
    a memory storing instructions, wherein the processor is configured to execute the instructions to:
    receive a content image frame of an interactive TV program containing interactive information encoded as a two dimensional graphic code embedded in the content image frame and visually appearing as part of the content image frame, wherein the interactive information comprises an interaction participation mode and an identification of the TV program, and is configured to facilitate an interactive participation of a second terminal;
    display the content image frame of the interactive TV program on the display screen;
    extract the two-dimensional graphic code embedded in the content image frame of the interactive TV program displayed on the display screen of the first terminal using an image recognition process while the content image frame is being displayed on the display screen;
obtain the interaction information based on the extracted two-dimensional graphic code;
store, in a buffer file, a correspondence relationship between the interaction information and a distribution time of the interaction information, wherein the distribution time is a time instant when the content image frame embedded with the interaction information is displayed; and
control the transmitter to send the same interaction information stored in the buffer file to the second terminal repeatedly within a predetermined period of interactive time from the distribution time so that the second terminal is able to timely interact with the interactive TV program according to the interaction information; and
delete the correspondence relationship from the buffer file and stop sending the interaction information to the second terminal after the predetermined period of interactive time expires.

2. The first terminal according to claim 1, wherein the processor is configured to execute the instructions to receive a request message for interaction information from the second terminal, wherein the request message comprises distribution time of interaction information or an identifier of the interactive TV program.

3. The first terminal according to claim 1, wherein the processor is configured to execute the instructions to:
obtain correspondence relationship between a set of interaction information and a set of distribution times for the interactive TV program before the interactive TV program is displayed on the display screen; and
pre-store the obtained correspondence relationship in the buffer file.

4. The first terminal according to claim 3, wherein the processor is configured to execute the instructions to:
upon determining that the interaction information obtained from the content image frame being displayed is different from a corresponding interaction information pre-stored in the buffer file, replace the corresponding pre-stored interaction information with the interaction information obtained from the content image frame being displayed.

5. The first terminal according to claim 2, wherein the request message comprises the identifier of the interactive TV program and the processor is configured to execute the at least one instructions to obtain the interaction information according to the identifier of the interactive TV program from the buffer file.

6. The first terminal according to claim 2, wherein the request message comprises the distribution time of the interaction information requested by the request message and wherein the processor is configured to execute the at least one instructions to send the interaction information stored in the buffer file to the second terminal when the distribution time of the interaction information stored in the buffer file matches the distribution time of the requested interaction information.

7. A method for a first terminal capable of receiving and playing an interactive TV program to prompt a second terminal to participate into a TV program interaction, the method comprising:
receiving a content image frame of an interactive TV program containing interactive information encoded as a two dimensional graphic code embedded in the content image frame and visually appearing as part of the content image frame, wherein the interactive information comprises an interaction participation mode and an identification of the TV program, and is configured to facilitate an interactive participation of a second terminal;
displaying the content image frame of the interactive TV program on a display screen of the first terminal;
extracting the two-dimensional graphic code embedded in the visual content image frame of the interactive TV program displayed on the display screen of the first terminal using an image recognition process while the content image frame is being displayed on the display screen;
obtaining the interaction information based on the extracted two-dimensional graphic code;
storing, in a buffer file, a correspondence relationship between the interaction information and a distribution time of the interaction information, wherein the distribution time is a time instant when the content image frame embedded with the interaction information is displayed; and
sending, by the first terminal, the same obtained interaction information stored in the buffer file to the second terminal repeatedly within a predetermined period of interactive time from the distribution time so that the second terminal is able to timely interact with the interactive TV program according to the interaction information; and
deleting the correspondence relationship from the buffer file and stopping sending the interaction information to the second terminal after the predetermined period of interactive time expires.

8. The method according to claim 7, further comprising receiving a request message for interaction information from the second terminal, wherein the request message comprises distribution time of the interaction information or an identifier of the interactive TV program.

9. The method according to claim 7, further comprising:
obtaining, by the first terminal, correspondence relationship between a set of interaction information and a set of distribution times for the interactive TV program before the interactive TV program is displayed on the display screen.

10. The method according to claim 9, further comprising:
upon determining that the interaction information obtained from the content image frame being displayed is different from a corresponding interaction information pre-stored in the buffer file, replacing the corresponding pre-stored interaction information with the interaction information obtained from the content image frame being displayed.

11. The method according to claim 8, wherein the request message comprises the identifier of the interactive TV program and wherein obtaining, by the first terminal, the interaction information from the buffer file comprises obtaining the interaction information according to the identifier of the interactive TV program from the buffer file.

12. The method according to claim 8, wherein the request message comprises the distribution time of the interaction information requested by the request message and wherein obtaining, by the first terminal, the interaction information from the buffer file comprises obtaining the interaction information according to the distribution time of the requested interaction information.

* * * * *